V. A. FYNN.
ALTERNATING CURRENT MOTOR.
APPLICATION FILED MAR. 6, 1909.
960,881.
Patented June 7, 1910.
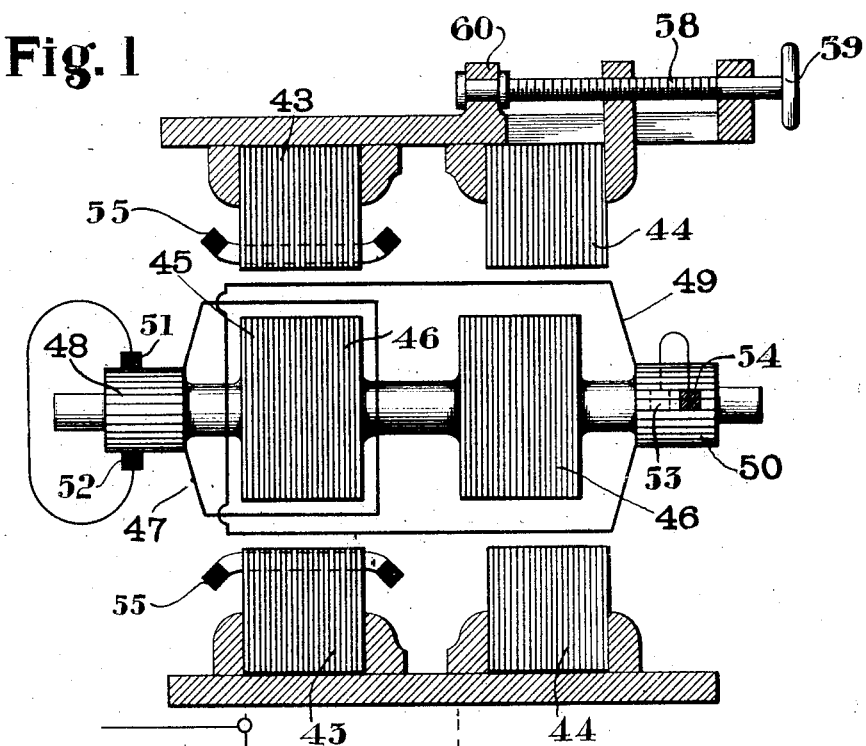
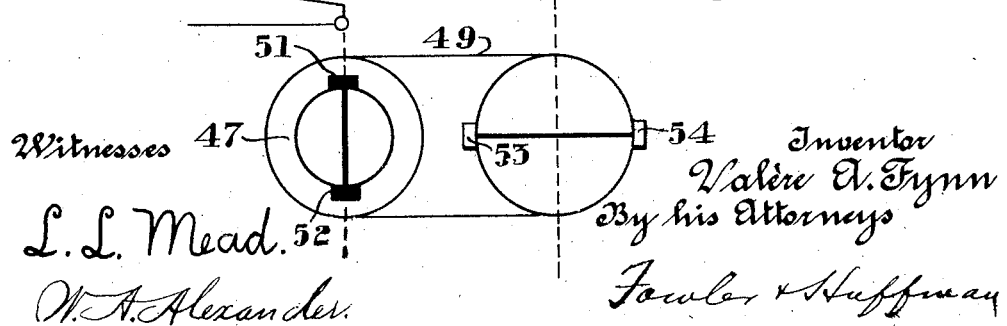

UNITED STATES PATENT OFFICE.

VALÈRE ALFRED FYNN, OF LONDON, ENGLAND.

ALTERNATING-CURRENT MOTOR.

960,881. Specification of Letters Patent. Patented June 7, 1910.

Original application filed December 19, 1906, Serial No. 348,659. Divided and this application filed March 6, 1909. Serial No. 481,761.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

This application is a division of my prior application, Serial No. 348,659, filed December 19, 1906.

My invention relates to alternating current commutator motors of the single-phase induction type the induced and commuted winding of which is closed over brushes and along more than one axis per pole pair.

The objects of this invention are to make it possible to operate such motors from a single-phase supply at any desired constant speed quite independently of the periodicity of the supply and of the number of poles of the motor, to make it possible to rationally vary or adjust this speed, and to improve their commutation.

According to this invention, I adjust the speed of a self-excited alternate current motor of the said type to a practically constant speed differing from the synchronous, or I vary its speed, by introducing self-induction into the exciting circuit, placing this self-induction outside the influence of the rotor working current and by varying its magnitude. In this manner the total flux corresponding to the exciting E. M. F. prevailing at any time will divide itself between that part of the rotor winding which does duty as field winding and the self-induction inserted in the exciting circuit, thus leaving only a part of the total flux due to the prevailing exciting E. M. F. for the production of a torque and a back E. M. F. along the working axis. I improve the commutation of this machine by adjusting the magnitude of the transformer field due to the main inducing winding and I improve its power factor in the manner already disclosed by me in earlier patents, *i. e.* by including in the working circuit of the rotor an E. M. F. approximately in phase quadrature with that impressed on the main stator winding or by including in the exciting circuit of the rotor an E. M. F. approximately in phase with that impressed on the main inducing winding.

In the accompanying drawings Figures 1 and 2 diagrammatically show one way of carrying this invention into practice. Fig. 1 indicates a possible mechanical arrangement of such a motor whereas Fig. 2 represents the relative position of the various windings and connections.

43 and 44 represent two coaxial stators embracing two rotors 45, 46 mounted on the same shaft. Stator 43 carries the main inducing winding 55 connected to the supply and rotor 45 carries two commuted windings 47 and 49 respectively connected to the commutators 48 and 50. Whereas winding 47 only embraces rotor 45, winding 49 embraces both rotors. Winding 47 is short-circuited by way of brushes 51, 52 along an axis preferably coinciding with that of the main inducing winding 55 on 43, winding 49 is short-circuited along an axis preferably displaced by 180/n degrees with respect to that of the main inducing winding 55 on 43. The letter "n" stands for the number of poles of the motor. The exciting E. M. F. is generated in that part of winding 49 which is disposed on rotor 45 and which revolves within the transformer field due to the main inducing winding 55 on 43, this part of 49 is therefore the field winding of the motor. The part of 49 disposed on 46 is nothing but a self-induction within the exciting circuit but outside the influence of the main stator inducing winding and therefore also outside the influence of the transformer field and of the rotor working current. The flux due to the E. M. F. generated in that part of 49 which is disposed on 45 will divide between the two self-inductions included in the exciting circuit according to the relative magnitude of these self-inductions. One of these is winding 49, rotor 45 and stator 43, the other is winding 49, rotor 46 and stator 44; the greater the latter, the smaller will be the flux threading 45 and 43 and the higher the speed of the motor for the flux due to 49 and threading 45 and 43 does duty as motor field and consequently controls the speed of the machine. The magnitude of the self-induction outside the influence of stator 43 can be varied for instance by varying the reluctance of its magnetic path. One way of varying this reluctance is shown in Fig. 1 and consists in longitudinally displacing stator 44 with respect to rotor 46 by means of the screw 58 operated by the handle 59 and engaging a lug 60 attached to stator 44, thus causing the motor speed to rise more or less above the synchronous. When this self-induction is zero the speed is practically equal to the synchronous

I claim—

1. In an alternating current motor, the combination with an inducing member producing a transformer field, of an induced member having an exciting circuit producing a motor field and a working circuit, said working circuit being closed by way of brushes along an axis approximately coinciding with that of the transformer field, and means for producing self-induction in said exciting circuit only, said means being disposed outside the inductive influence of both the transformer and the motor fields.

2. In an alternating current motor, the combination with an inducing member producing a transformer field, of an induced member having an exciting circuit closed by way of brushes and producing a motor field and a working circuit, said working circuit being closed by way of brushes along an axis approximately coinciding with that of the transformer field, and means for producing self induction in said exciting circuit only, said means being disposed outside the inductive influence of both the transformer and the motor fields.

3. In an alternating current motor, the combination with an inducing member producing a transformer field, of an induced member having an exciting circuit producing a motor field and a working circuit, said working circuit being closed by way of brushes along an axis approximately coinciding with that of the transformer field, means for producing self induction in said exciting circuit only; said means being disposed outside the inductive influence of both the transformer and the motor fields, and means for varying the magnitude of said self induction.

In witness whereof I have hereunto set my hand and affixed my seal in the presence of the two subscribing witnesses.

VALÈRE ALFRED FYNN. [L. S.]

Witnesses:
    W. A. ALEXANDER,
    E. E. HUFFMAN.